United States Patent
Lee

(10) Patent No.: US 11,164,002 B2
(45) Date of Patent: Nov. 2, 2021

(54) METHOD FOR HUMAN-MACHINE INTERACTION AND APPARATUS FOR THE SAME

(71) Applicant: ELECTRONICS AND TELECOMMUNICATIONS RESEARCH INSTITUTE, Daejeon (KR)

(72) Inventor: Joo-Haeng Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 73 days.

(21) Appl. No.: 16/728,827

(22) Filed: Dec. 27, 2019

(65) Prior Publication Data

US 2021/0174084 A1   Jun. 10, 2021

(30) Foreign Application Priority Data

Dec. 9, 2019   (KR) .......................... 10-2019-0162801

(51) Int. Cl.
| | |
|---|---|
| G06K 9/00 | (2006.01) |
| G06T 19/00 | (2011.01) |
| G06F 3/0481 | (2013.01) |
| G06F 3/01 | (2006.01) |
| G06T 19/20 | (2011.01) |

(52) U.S. Cl.
CPC .......... *G06K 9/00671* (2013.01); *G06F 3/011* (2013.01); *G06F 3/017* (2013.01); *G06F 3/04815* (2013.01); *G06T 19/006* (2013.01); *G06T 19/20* (2013.01)

(58) Field of Classification Search
CPC ........................ G06K 9/00671; G06F 3/04815
See application file for complete search history.

(56) References Cited

U.S. PATENT DOCUMENTS

| | | | |
|---|---|---|---|
| 7,714,895 | B2 | 5/2010 | Pretlove et al. |
| 9,639,984 | B2 | 5/2017 | Mullins. |
| 9,881,423 | B2 | 1/2018 | Cho et al. |

(Continued)

FOREIGN PATENT DOCUMENTS

| | | |
|---|---|---|
| KR | 100930370 B1 | 12/2009 |
| KR | 20140025814 A | 3/2014 |
| KR | 101680124 B1 | 11/2016 |

*Primary Examiner* — Phi Hoang

(57) ABSTRACT

Disclosed herein are a method for human-machine interaction and an apparatus for the same. The method includes receiving object identification input for identifying an object related to the task to be dictated to a machine through the I/O interface of a user device that displays a 3D space; displaying an object identification visual interface, corresponding to the object identified within the space recognized by the machine, on the user device in an augmented-reality manner; receiving position identification input for identifying a position in the 3D space related to the task; displaying a position identification visual interface, corresponding to the position identified within the space recognized by the machine, on the user device in an augmented-reality manner; and receiving information related to the result of the task performed through the machine.

14 Claims, 17 Drawing Sheets

(56) References Cited

U.S. PATENT DOCUMENTS

| | | | |
|---|---|---|---|
| 2006/0203131 A1* | 9/2006 | Gunji | A61B 6/032 348/739 |
| 2013/0211592 A1* | 8/2013 | Kim | G06F 3/017 700/258 |
| 2016/0114418 A1* | 4/2016 | Jones | B23K 9/1274 219/124.1 |
| 2017/0053456 A1 | 2/2017 | Cho et al. | |
| 2017/0165841 A1* | 6/2017 | Kamoi | H04N 7/183 |
| 2019/0043374 A1* | 2/2019 | Mere | G08G 5/0013 |
| 2020/0019156 A1* | 1/2020 | Drew | G05D 1/0038 |
| 2020/0126315 A1* | 4/2020 | Song | G06T 7/75 |
| 2020/0249654 A1* | 8/2020 | Edwards | G05B 19/414 |

\* cited by examiner

METHOD FOR HUMAN-MACHINE INTERACTION AND APPARATUS FOR THE SAME

CROSS REFERENCE TO RELATED APPLICATION

This application claims the benefit of Korean Patent Application No. 10-2019-0162801, filed Dec. 9, 2019, which is hereby incorporated by reference in its entirety into this application.

BACKGROUND OF THE INVENTION

1. Technical Field

The present invention relates generally to technology for human-machine interaction, and more particularly to mobile technology, image recognition technology, 3D-information-processing technology, augmented reality technology, robot control technology, and human-machine interaction technology using the same.

2. Description of the Related Art

Recently, cooperative robots, which are able to cooperate with humans, have been actively developed through advancement in robot technology. There are many robots already released on the market. Robots unsuitable for performing commercial tasks but able to coexist with humans, such as a care robot in a home, a guide robot in a store, and the like, have been developed and come into wide use. In this situation, humans and robots need to interact with each other through effective communication.

Particularly, it is necessary to clearly dictate the intention of a human in order to receive service from a robot. When a task is simple, it is possible to give an instruction using a menu-driven method involving a computer or a smartphone. However, it is difficult to dictate a task for selecting a specific object in a complex 3D space and moving the same to a specific location through only a menu-driven UI. Also, a voice interface is not adequate to accurately specify 3D information. A wearable augmented-reality device is difficult to popularize due to the low availability and high cost compared to a smartphone. Moreover, the narrow angle of view and battery life thereof are also problematic.

In the present invention, a method for efficient human-machine interaction and an apparatus for the same, which are capable of efficiently dictating a 3D task to a machine and effectively checking the result, are proposed, and a method for applying the proposed method and apparatus to an application related to a complicated 3D task and service for real-world objects is also proposed.

Meanwhile, Korean Patent Application and Publication No. 10-2014-0025814, titled "apparatus for human-robot interaction service", discloses an apparatus for a human-robot interaction service that is able to improve the reusability of components and efficiency of development of service applications and components by presenting a unified interface between an application and components of service robot technology.

SUMMARY OF THE INVENTION

An object of the present invention is to enable a human and a robot to interact with each other by accurately and efficiently sharing complicated 3D task information therebetween.

Another object of the present invention is to dictate a complicated 3D task to a robot in an intuitive manner and to visualize what the robot understands.

A further object of the present invention is to provide applications related to a complicated 3D task and service for a real-world object.

Yet another object of the present invention is to provide a task instruction to a robot in an interactive manner.

In order to accomplish the above objects, a method for human-machine interaction according to an embodiment of the present invention includes receiving object identification input for identifying an object related to a task to be dictated to a machine through the I/O interface of a user device that displays a 3D space; displaying an object identification visual interface, corresponding to the object identified within a space recognized by the machine, on the user device in an augmented-reality manner; receiving position identification input for identifying a position in the 3D space related to the task; displaying a position identification visual interface, corresponding to the position identified within the space recognized by the machine, on the user device in an augmented-reality manner; and receiving information related to the result of the task performed through the machine.

Here, the object identification visual interface may include posture information displayed within a preset area from the center of the identified object.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

Here, the position may be identified differently depending on the type of the identified object.

Here, the peripheral information may be generated differently depending on the type of the identified object.

Here, the method may further include displaying task visual feedback related to the task, identified based on the object and the position, on the user device in an augmented-reality manner.

Here, the object identification visual interface may include information about a path along which the identified object is able to move within the 3D space.

Also, in order to accomplish the above objects, a user device for human-machine interaction according to an embodiment of the present invention includes one or more processors and executable memory for storing at least one program executed by the one or more processors. The at least one program may be configured to receive object identification input for identifying an object related to a task to be dictated to a machine through an I/O interface that displays a 3D space, to display an object identification visual interface corresponding to the object identified within a space recognized by the machine in an augmented-reality manner, to receive position identification input for identifying a position in the 3D space related to the task, and to display a position identification visual interface corresponding to the position identified within the space recognized by the machine in an augmented-reality manner.

Here, the object identification visual interface may include posture information displayed within a preset area from the center of the identified object.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

Here, the position may be identified differently depending on the type of the identified object.

Here, the peripheral information may be generated differently depending on the type of the identified object.

Here, the at least one program may display task visual feedback related to the task identified based on the object and the position in an augmented-reality manner.

Here, the object identification visual interface may include information about a path along which the identified object is able to move within the 3D space.

Also, in order to accomplish the above objects, a machine device for human-machine interaction according to an embodiment of the present invention includes one or more processors and executable memory for storing at least one program executed by the one or more processors. The at least one program may be configured to receive object identification input for identifying an object related to a task to be dictated by a user device, to generate object identification visual interface information corresponding to the object identified within a space in response to the object identification input, to receive position identification input for identifying a position within the space from the user device, to generate position identification visual interface information corresponding to the position identified within the space in response to the position identification input, to identify the task based on the object and the position, and to perform an operation corresponding to the identified task.

Here, the object identification visual interface may include posture information displayed within a preset area from the center of the identified object.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

Here, the position may be identified differently depending on the type of the identified object.

Here, the peripheral information may be generated differently depending on the type of the identified object.

Here, the user device may display task visual feedback related to the task identified based on the object and the position in an augmented-reality manner.

Here, the object identification visual interface may include information about a path along which the identified object is able to move within the 3D space.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
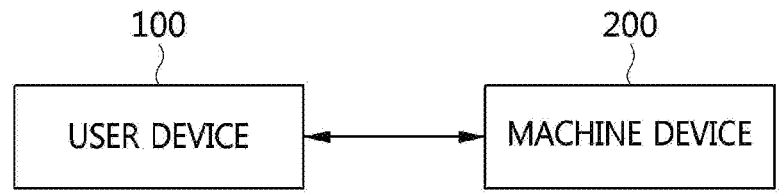
FIG. 1 is a block diagram illustrating a human-machine interaction system according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified. Also, the term " . . . unit" or " . . . module" described herein refers to a unit for processing at least one function or operation, and may be implemented as hardware, software, or a combination thereof.

Hereinafter, a preferred embodiment of the present invention will be described in detail with reference to the accompanying drawings.

FIG. 1 is a block diagram illustrating a human-machine interaction system according to an embodiment of the present invention.

Referring to FIG. 1, the human-machine interaction system according to an embodiment of the present invention includes a user device 100 and a machine device 200.

The user device 100 may receive object identification input for identifying an object related to the task to be dictated to the machine device 200 through an I/O interface that displays a 3D space.

Here, the user device 100 may display an object identification visual interface corresponding to the object identified within the space recognized by the machine device 200 in an augmented-reality manner.

Here, the user device 100 may receive position identification input for identifying a position in the 3D space related to the task.

Here, the user device 100 may display a position identification visual interface corresponding to the position identified within the space recognized by the machine device 200 in an augmented-reality manner.

Here, the user device 100 may be a mobile device, a smartphone, a smart pad, or the like.

Here, the user device 100 may recognize the target to be recognized, such as an object, a person, an environment, a signal, and the like.

Here, the user device 100 may detect and identify the target to be recognized, and may recognize a posture, an abnormal state, and a language.

Here, the user device 100 may receive touch input and provide visual and haptic feedback, and may provide interaction by sensing a motion, such as shaking, or the like, thorough motion tracking.

Also, the machine device 200 may receive object identification input for identifying an object related to the task to be dictated by the user device 100.

Here, the machine device 200 may generate object identification visual interface information corresponding to the object identified within the space in response to the object identification input.

Here, the machine device 200 may receive position identification input for identifying a position within the space from the user device 100.

Here, the machine device 200 may generate position identification visual interface information corresponding to the position identified within the space in response to the position identification input.

Here, the machine device 200 may identify the task based on the object and the position, and may perform an operation corresponding to the identified task.

Here, the machine device 200 may be any of various machines in the form of robots, such as a cooperative robot, a care robot, a working robot, a cleaning robot, a humanoid robot, and the like, or a task machine.

Here, the machine device 200 may recognize the target to be recognized, such as an object, a person, an environment, a signal, and the like.

Here, the machine device 200 may detect and identify the target to be recognized, and may recognize a posture, an abnormal state, and a language.

When the machine device 200 is a cleaning robot, functions performed thereby will be described.

For example, in the case of a cleaning robot, the direction in which the cleaning robot is moving and the stride length of the cleaning robot are important. Accordingly, the direction and path in which the cleaning robot can physically move may be displayed as feedback information.

Here, because the cleaning robot is only limitedly able to rotate and change a path thereof, the accessible area may be output in consideration of such limitations.

Here, the cleaning robot may display an error in response to input that ignores the accessible area.

Here, the cleaning robot may calculate and output the accessibility of the cleaning robot (or the possibility of a collision) in consideration of the characteristics of a plane, which is recognized by considering a peripheral area.

Here, because the task place of the cleaning robot is extended based on a path, an interface showing the extended task place according to the movement of the mobile device may be additionally provided.

Also, when the machine device 200 is a working robot, the functions performed thereby will be described.

For example, the working robot may perform a grasping task.

Here, the working robot may display an error for an incorrect aiming spot mistakenly designated by a user (e.g., the floor under a table).

Here, the working robot may output the geometric shape of an object, the physical characteristics (the center of mass) thereof, and the state of the aiming spot (information about whether the aiming spot is a plane and whether another object is present in the aiming spot).

Here, the working robot may determine whether the object is able to be safely placed in the aiming spot in consideration of the geometric shape of the object, the physical characteristics (the center of mass) thereof, and the state of the aiming spot, and may visually output the determination result.

Figure 2:
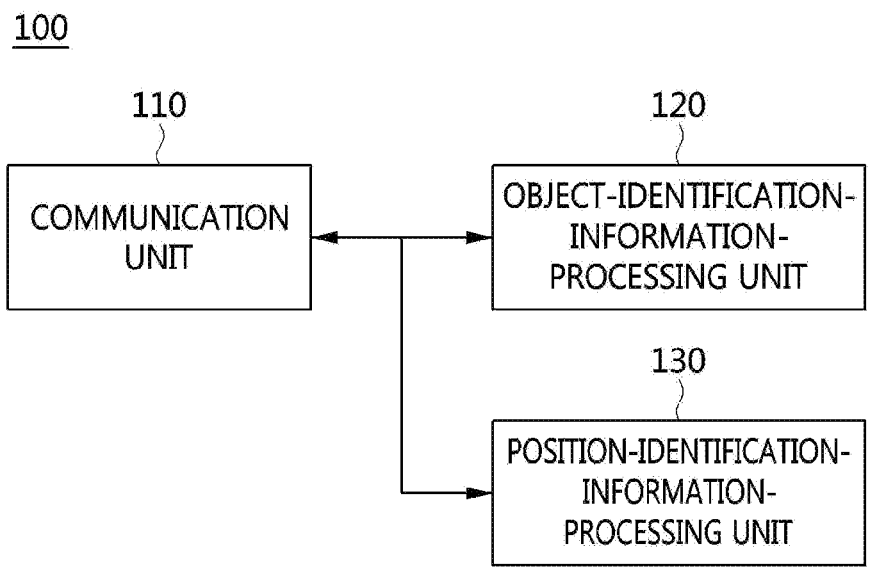
FIG. 2 is a block diagram illustrating a user device for human-machine interaction according to an embodiment of the present invention.

FIG. 2 is a block diagram illustrating a user device for human-machine interaction according to an embodiment of the present invention.

Referring to FIG. 2, the user device 100 for human-machine interaction according to an embodiment of the present invention includes a communication unit 110, an object-identification-information-processing unit 120, and a position-identification-information-processing unit 130.

The communication unit 110 may transmit object identification input, which is required for identifying an object related to the task to be dictated to a machine device 200, and position identification input.

The object-identification-information-processing unit 120 may receive object identification input for identifying the object related to the task to be dictated to the machine device 200 through an I/O interface that displays a 3D space.

Here, the object-identification-information-processing unit 120 may display an object identification visual interface corresponding to the object identified within the space recognized by the machine device 200 in an augmented-reality manner.

The position-identification-information-processing unit 130 may receive position identification input for identifying a position in the 3D space related to the task.

Here, the position-identification-information-processing unit 130 may display a position identification visual interface corresponding to the position identified within the space recognized by the machine device 200 in an augmented-reality manner.

Here, the object identification visual interface may include posture information displayed within a preset area from the center of the identified object.

Here, the posture information may be information indicative of the posture of a recognized object. For example, the posture information may be information that represents the posture of the recognized object in the 3D space.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

For example, the position identification visual interface, representing a position on a smooth plane, may be generated so as to differ from the position identification visual interface representing a position on a rough plane.

For example, when a recognized object is an object on the desk (in which case a peripheral object is the desk), a position identification visual interface may be generated so as to differ from a position identification visual interface generated when the recognized object is an object on the wall (in which case the peripheral object is the wall). That is, because the task expected for the object on the desk differs from the task expected for the object on the wall, different position identification visual interfaces may be provided for the two respective cases. For example, when the recognized object is the object on the desk, the position identification visual interface corresponding to the two axes based on the surface of the desk (that is, the x-axis and y-axis) may be provided. For example, when the recognized object is the object on the wall, the position identification visual interface corresponding to the two axes based on the wall (the y-axis and z-axis) may be provided.

Here, the position may be identified differently depending on the type of the recognized object.

For example, when the position corresponding to the position identification input is 'on the desk' or 'the floor under the desk', the position is identified as 'the floor under the desk' for an object having a property of moving on the floor (for example, a cleaning robot), but is identified as 'on the desk' for an object moving only on the desk.

Here, the peripheral information may be generated differently depending on the type of the recognized object.

Here, the object-identification-information-processing unit 120 may display task visual feedback related to the task, identified based on the object and the position, in an augmented-reality manner.

For example, the task visual feedback may be a preview of the task performed for the identified object in the identified position.

Here, the object identification visual interface may include information about a path along which the identified object is able to move within the 3D space.

Figure 3:
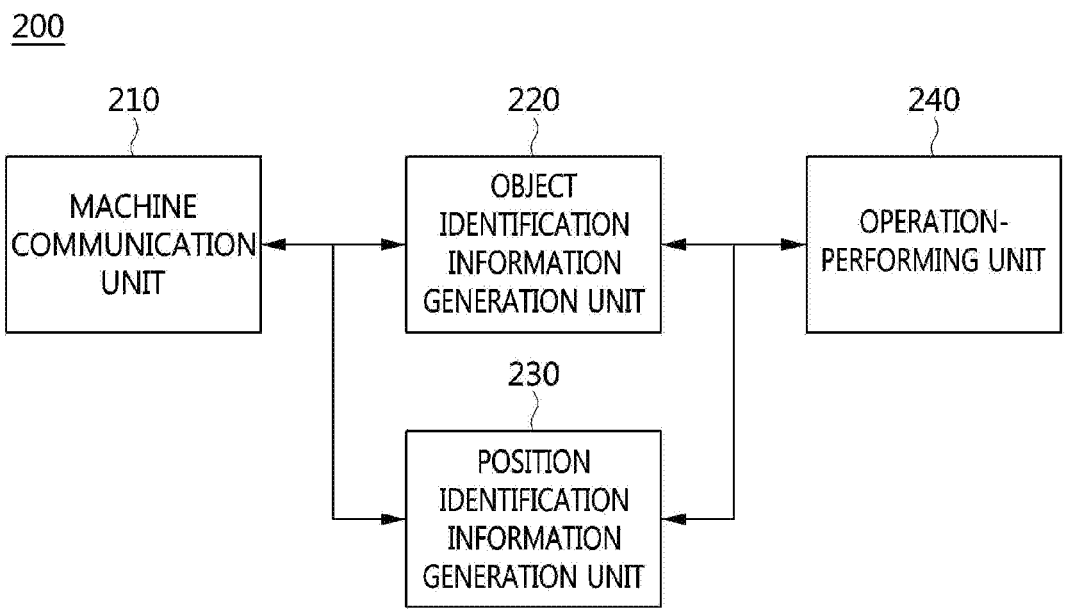
FIG. 3 is a block diagram illustrating a machine device for human-machine interaction according to an embodiment of the present invention.

FIG. 3 is a block diagram illustrating a machine device for human-machine interaction according to an embodiment of the present invention.

Referring to FIG. 3, the machine device 200 for human-machine interaction according to an embodiment of the present invention includes a machine communication unit 210, an object identification information generation unit 220, a position identification information generation unit 230, and an operation-performing unit 240.

The machine communication unit 210 may receive object identification input for identifying an object related to the task to be dictated by a user device 100.

The object identification information generation unit 220 may generate object identification visual interface information corresponding to the object identified within a space in response to the object identification input.

The machine communication unit 210 may receive position identification input for identifying a position within the space from the user device 100.

The position identification information generation unit 230 may generate position identification visual interface information corresponding to the position identified within the space in response to the position identification input.

The operation-performing unit 240 may identify the task based on the object and the position and perform an operation corresponding to the identified task.

Here, the object identification visual interface may include posture information displayed within a preset area from the center of the identified object.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

Here, the position may be identified differently depending on the type of the recognized object.

Here, the peripheral information may be generated differently depending on the type of the recognized object.

Here, the user device 100 may display task visual feedback related to the task identified based on the object and the position in an augmented-reality manner.

Here, the object identification visual interface may include information about a path along which the identified object is able to move within the 3D space.

Figure 4:
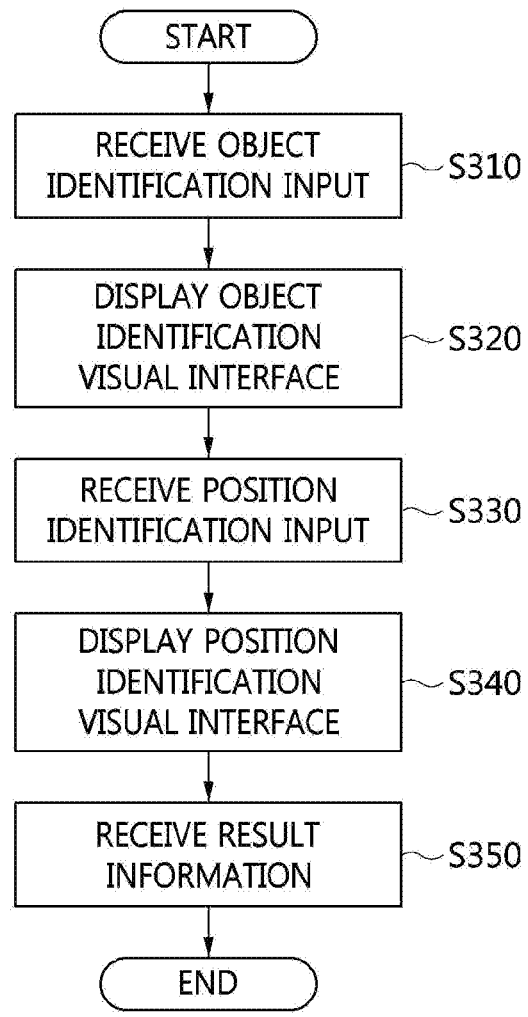
FIG. 4 is a flowchart illustrating a human-machine interaction method of a user device according to an embodiment of the present invention.

FIG. 4 is a flowchart illustrating a human-machine interaction method of a user device according to an embodiment of the present invention.

Referring to FIG. 4, in the human-machine interaction method of a user device according to an embodiment of the present invention, first, object identification input may be received at step S310.

That is, at step S310, object identification input for identifying an object related to the task to be dictated to a machine device 200 may be received through an I/O interface that displays a 3D space.

Also, in the human-machine interaction method of a user device according to an embodiment of the present invention, an object identification visual interface may be displayed at step S320.

That is, at step S320, the object identification visual interface corresponding to the object identified within the space recognized by the machine device 200 may be displayed in an augmented-reality manner.

Also, in the human-machine interaction method of a user device according to an embodiment of the present invention, position identification input may be received at step S330.

That is, at step S330, position identification input for identifying a position within the 3D space related to the task may be received.

Also, in the human-machine interaction method of a user device according to an embodiment of the present invention, a position identification visual interface may be displayed at step S340.

That is, at step S340, the position identification visual interface corresponding to the position identified within the space recognized by the machine device 200 may be displayed in an augmented-reality manner.

Also, in the human-machine interaction method of a user device according to an embodiment of the present invention, result information may be received at step S350.

That is, at step S350, after transmission of object identification input for identifying the object related to the task to be dictated to the machine device 200, information about the result of performing the operation may be received from the machine device 200.

Here, the object identification visual interface may include posture information displayed within a preset area from the center of the identified object.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

Here, the position may be identified differently depending on the type of the recognized object.

Here, the peripheral information may be generated differently depending on the type of the recognized object.

Here, at step S340, task visual feedback related to the task identified based on the object and the position may be displayed in an augmented-reality manner.

Here, the object identification visual interface may include information about a path along which the identified object is able to move within the 3D space.

Figure 5:
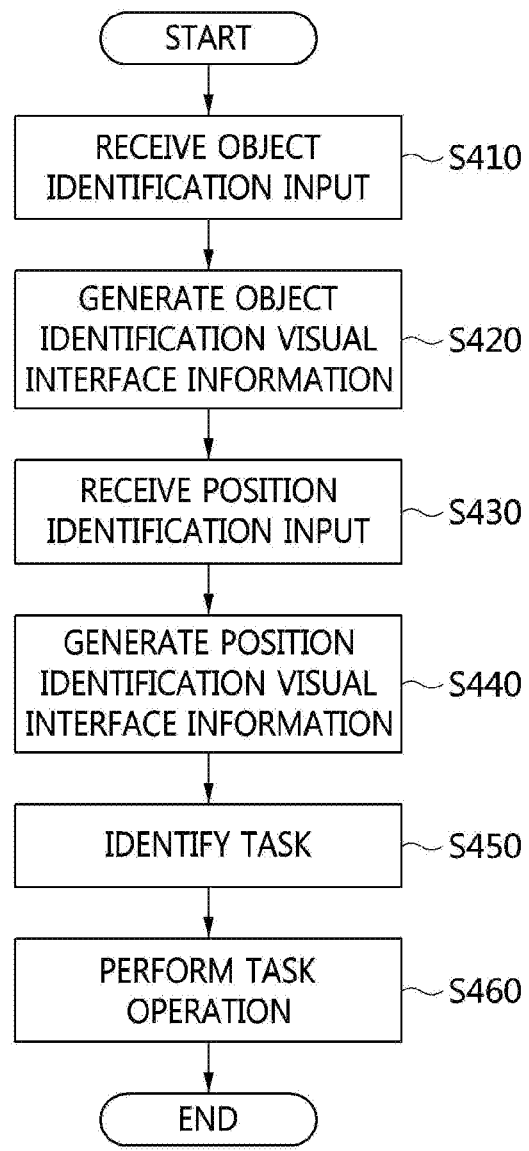
FIG. 5 is a flowchart illustrating a human-machine interaction method of a machine device according to an embodiment of the present invention.

FIG. 5 is a flowchart illustrating a human-machine interaction method of a machine device according to an embodiment of the present invention.

Referring to FIG. 5, in the human-machine interaction method of a machine device according to an embodiment of the present invention, first, object identification input may be received at step S410.

That is, at step S410, object identification input for identifying an object related to the task to be dictated by a user device 100 may be received.

Also, in the human-machine interaction method of a machine device according to an embodiment of the present invention, object identification visual interface information may be generated at step S420.

That is, at step S420, object identification visual interface information corresponding to the object identified within a space in response to the object identification input may be generated.

Also, in the human-machine interaction method of a machine device according to an embodiment of the present invention, position identification input may be received at step S430.

That is, at step S430, position identification input for identifying a position within the space may be received from the user device 100.

Also, in the human-machine interaction method of a machine device according to an embodiment of the present invention, position identification visual interface information may be generated at step S440.

That is, at step S440, position identification visual interface information corresponding to the position identified within the space in response to the position identification input may be generated.

Also, in the human-machine interaction method of a machine device according to an embodiment of the present invention, the task may be identified at step S450.

That is, at step S450, the task may be identified based on the object and the position.

Also, in the human-machine interaction method of a machine device according to an embodiment of the present invention, a task operation may be performed at step S460.

That is, at step S460, an operation corresponding to the identified task may be performed.

Here, the object identification visual interface may include posture information displayed within a preset area from the center of the identified object.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

Here, the position may be identified differently depending on the type of the recognized object.

Here, the peripheral information may be generated differently depending on the type of the recognized object.

Here, the user device 100 may display task visual feedback related to the task identified based on the object and the position in an augmented-reality manner.

Here, the object identification visual interface may include information about a path along which the identified object is able to move within the 3D space.

Figure 6:
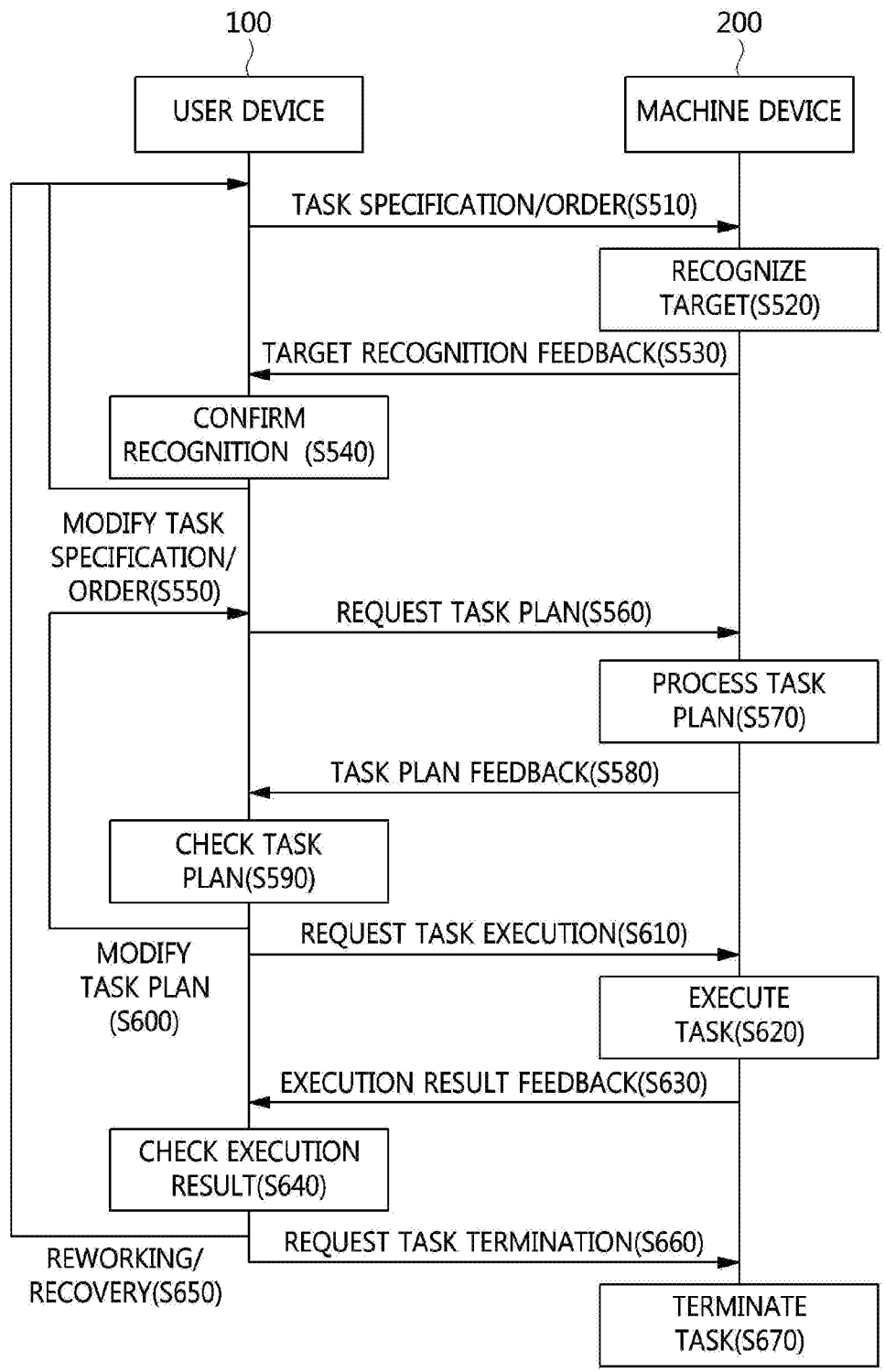
FIG. 6 is a sequence diagram illustrating a human-machine interaction method according to an embodiment of the present invention.

FIG. 6 is a sequence diagram illustrating a method for human-machine interaction according to an embodiment of the present invention.

Referring to FIG. 6, it is confirmed that the method for human-machine interaction according to an embodiment of the present invention is performed by a user device 100 and a machine device 200.

First, the user device 100 may generate a task specification for requesting the machine device 200 to recognize a target and to perform a task, and may dictate the task to the machine device 200 by transmitting the task specification thereto at step S510.

Here, the machine device 200 may recognize the target for which the task is to be performed with respect to the received task specification at step S520, and may feed the result of recognition of the target back to the user device at step S530.

Here, the user device 100 may check the feedback from the machine device 200 at step S540, and may modify the task specification and dictate the task again at step S550 when it is determined that the machine device 200 failed to recognize the target.

Here, when it is determined that the machine device 200 succeeded in recognition of the target, the user device 100 may request a task plan from the machine device 200 at step S560.

Here, the machine device 200 may process the task plan at step S570 and feed the task plan back to the user device 100 at step S580.

Here, the user device 100 may check the task plan at step S590. When it is necessary to modify the task plan, the user device 100 may modify the task plan at step S600 and again request the task plan at step S560.

Here, when it is not necessary to modify the task plan, the user device may request the machine device 200 to perform the task at step S610.

Here, the machine device 200 may perform the task at step S620, and may feed the result of performing the task back to the user device 100 at step S630.

Here, the user device 100 may check the result of performing the task at step S640 and perform reprocessing and recovery for the result of performing the task at step S650. When the result of performing the task satisfies a preset objective, the user device 100 may request the machine device 200 to terminate the task at step S660.

Here, when it receives the request for terminating the task from the user device 100, the machine device 200 may terminate the task at step S670.

FIGS. 7 to 12 are views illustrating an example of a task process using a human-machine interaction method according to an embodiment of the present invention.

Referring to FIGS. 7 to 12, the process of dictating a task of moving an object 10 through a human-machine interaction method according to an embodiment of the present invention is illustrated.

Figure 7:
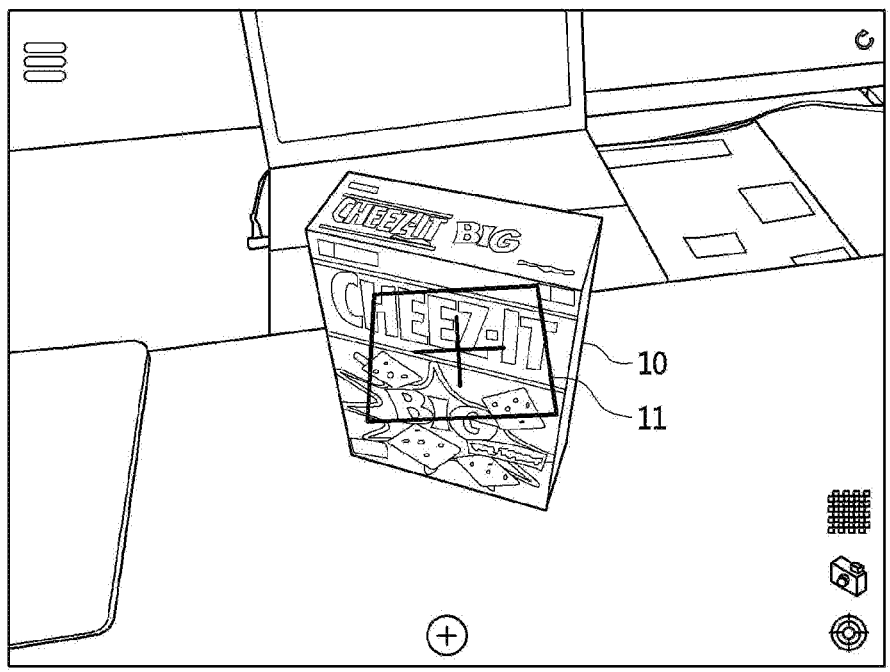
FIGS. 7 to 12 are views illustrating an example of a task process using a human-machine interaction method according to an embodiment of the present invention.

Referring to FIG. 7, an image of the object 10 may be captured using an apparatus for the human-machine interaction method.

Here, the apparatus for the human-machine interaction method may be the user device 100 and the machine device 200, which are described above.

Here, using the function of the device or the function of an external server for the captured image, the apparatus for the human-machine interaction method may detect the object 10 in a target image, identify the object, and generate posture information by calculating the posture of the object.

Figure 8:
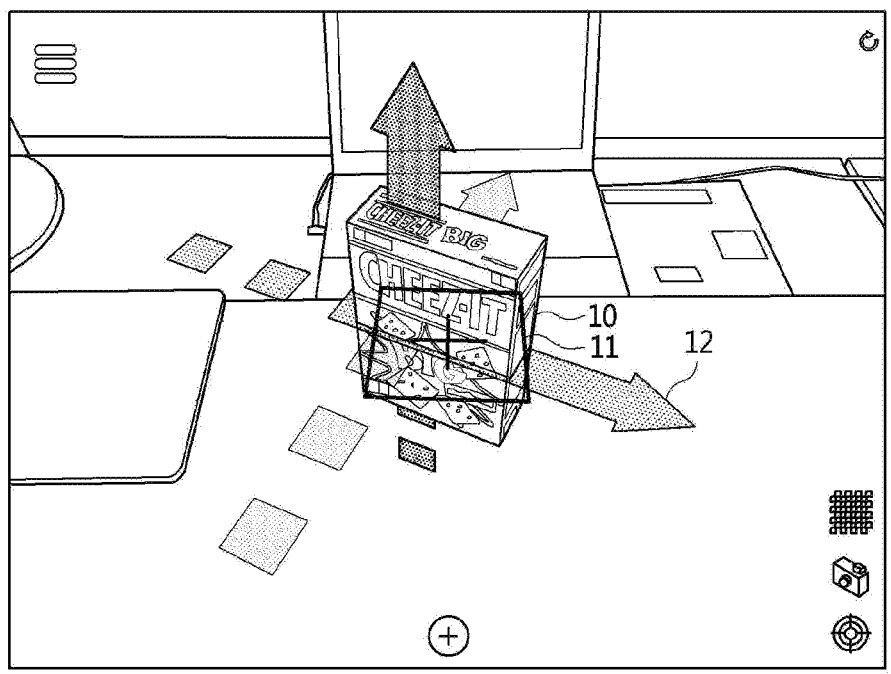

Referring to FIG. 8, the apparatus for the human-machine interaction method may visualize an object identification interface including the image of the object 10 by displaying the result of identification of the recognized object, which is indicated by a cross mark 11, and posture information 12 using an augmented-reality method.

Figure 9:
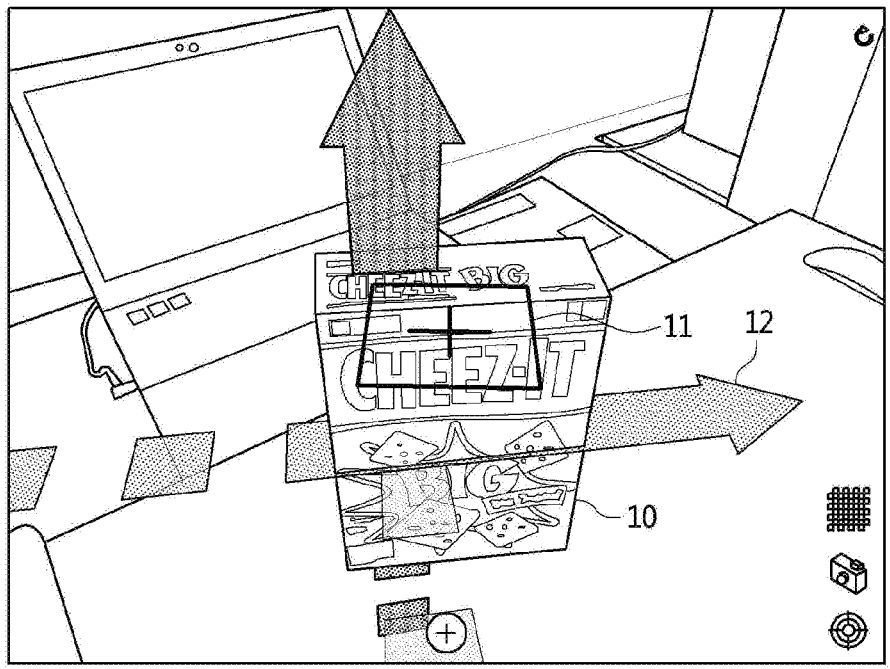

Referring to FIG. 9, the apparatus for the human-machine interaction method visualizes the object identification interface by accurately matching the result of identification of the object with the posture information 12 using a tracking function even though the object 10 is projected from a different position because the position of the terminal is changed.

For example, the user device 100 may tell information about the object, for which the task is to be performed, to the machine device 200, and the machine device 200 may deliver the result of identifying the object and the posture information to a user in a visual manner.

Accordingly, using the user device 100, the user and the machine device 200 may mutually check information about the task.

Here, the user device 100 may modify the task of the machine device 200 by designating an object or modifying the posture of the object.

Figure 10:
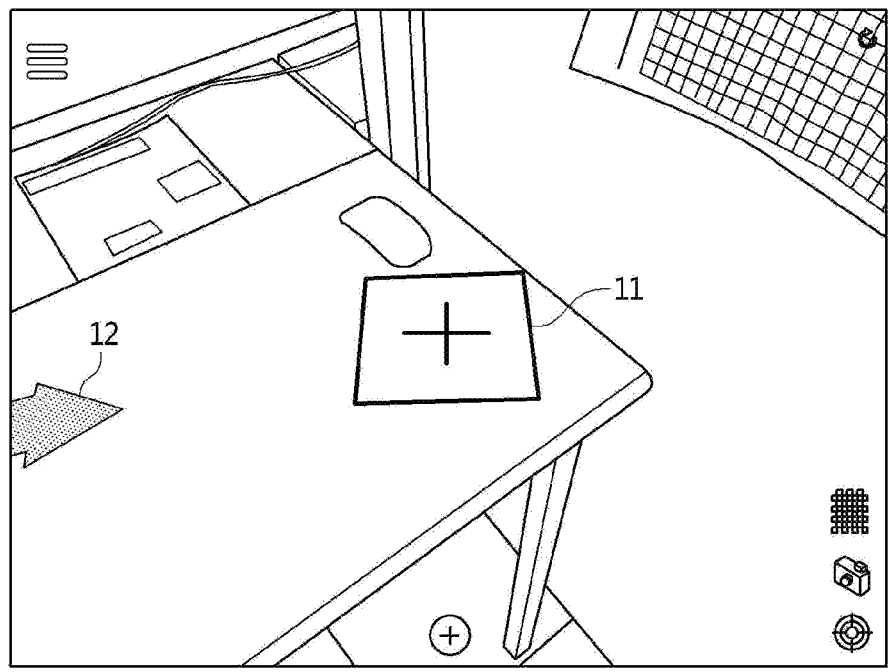

Referring to FIG. 10, an aiming spot, which is the position to which the object 10 is to be moved, is designated.

To this end, the apparatus for the human-machine interaction method changes the capture direction so as to be directed to the aiming spot.

Here, the target area indicated by the cross mark 11 is the aiming spot.

For example, the apparatus for the human-machine interaction method may designate the target area in such a way that a user inputs the position of the target area using a UI button or a touch with a finger.

The apparatus for the human-machine interaction method may recognize a position in the image as the position in the 3D space because the position is tracked.

Here, the apparatus for the human-machine interaction method may calculate the position in the 3D space using the system thereof or an external system.

Figure 11:
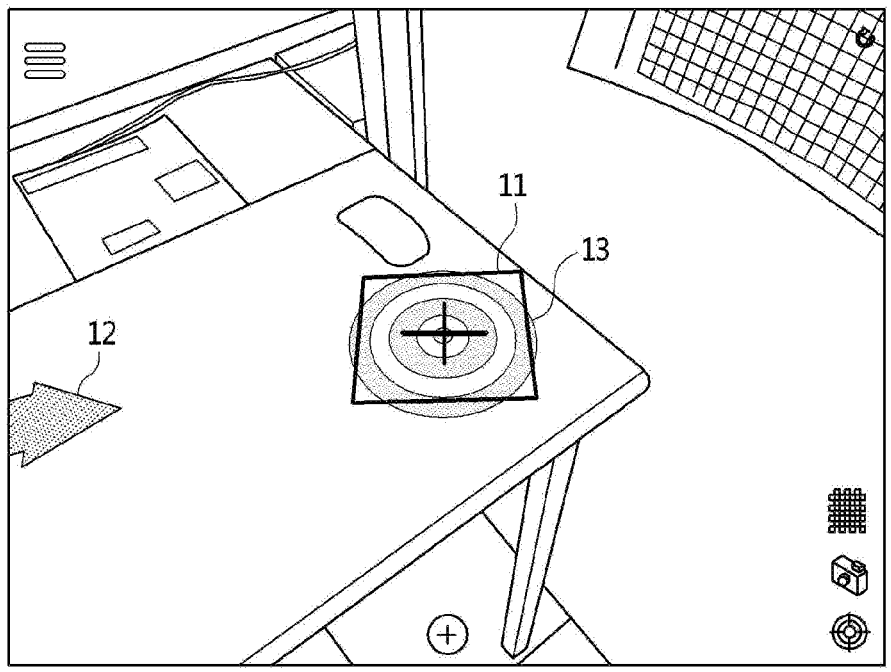

Referring to FIG. 11, the apparatus for the human-machine interaction method may display the aiming spot 13, the 3D position of which is calculated, using an augmented-reality method.

Here, the user device 100 may check whether the machine device 200 correctly understands the 3D aiming spot 13 through visualized feedback.

Here, the user device 100 may modify the 3D aiming spot 13 when the 3D aiming spot 13 is wrongly set.

Figure 12:
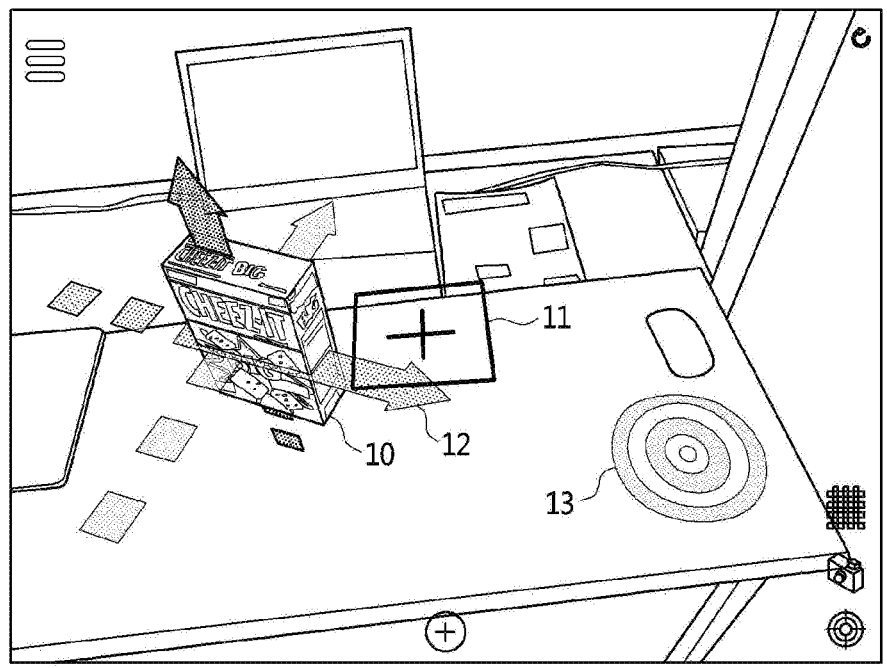

Referring to FIG. 12, it is confirmed that the object 10 and the 3D aiming spot 13 are correctly set using an augmented-reality method.

Also, referring to FIGS. 7 to 12, the interface screen output by the user device 100 is illustrated, and three buttons may be displayed in the bottom-right corner of the interface screen.

Here, a user may perform the following functions by touching the three buttons on the interface screen of the user device 100.

The first button may provide a marker for setting a coordinate system common to the user device 100 and the machine device 200.

Here, when the user device 100 and the machine device 200 capture an image of the marker, the 3D reference point of the user device 100 and the machine device 200 may be calculated based on the marker.

Here, the user device 100 and the machine device 200 may calculate the position and orientation of the user device 100 by tracking the user device 100 based on the 3D reference point.

Here, the user device 100 and the machine device 200 may set the common coordinate system by sharing the 3D reference point.

The second button may provide the function of designating a target object.

For example, when the user touches the second button in the state in which the orientation of the user device 100 is set to point to the object 10 and in which the cross mark 11 is placed on the object 10, as shown in FIG. 7, the object 10 placed at the position indicated by the cross mark 11 may be recognized in the captured image.

The third button may provide the function of setting an aiming spot.

For example, when the third button is touched in the state in which the cross mark 11 is placed at a desired position, as shown in FIG. 10, the position indicated by the cross mark 11 may be set as the aiming spot in the captured image.

FIGS. 13 to 21 are views illustrating a user interface corresponding to an example of a task process using a human-machine interaction method according to an embodiment of the present invention.

Figure 13:
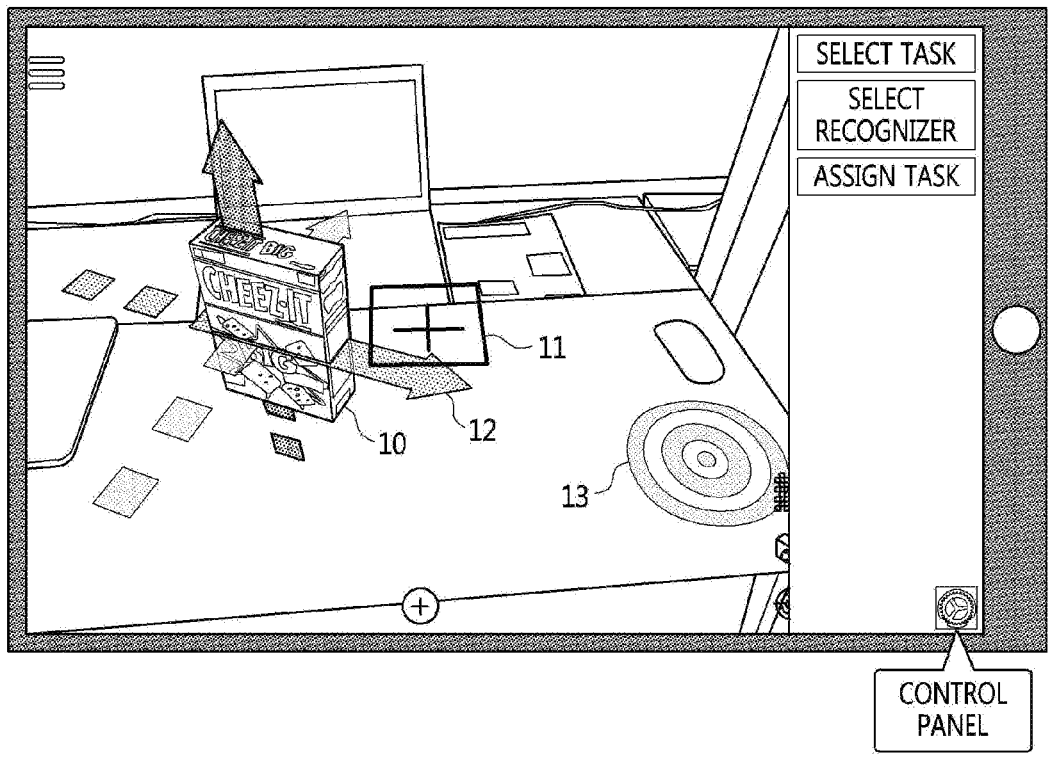
FIGS. 13 to 21 are views illustrating a user interface corresponding to an example of a task process using a human-machine interaction method according to an embodiment of the present invention.

Referring to FIG. 13, a user interface corresponding to an example of a task process using a human-machine interaction method according to an embodiment of the present invention is illustrated in detail.

The apparatus for the human-machine interaction method may display a task selection button, a recognizer selection button, a task order button, and a control panel button through the user interface.

Figure 14:
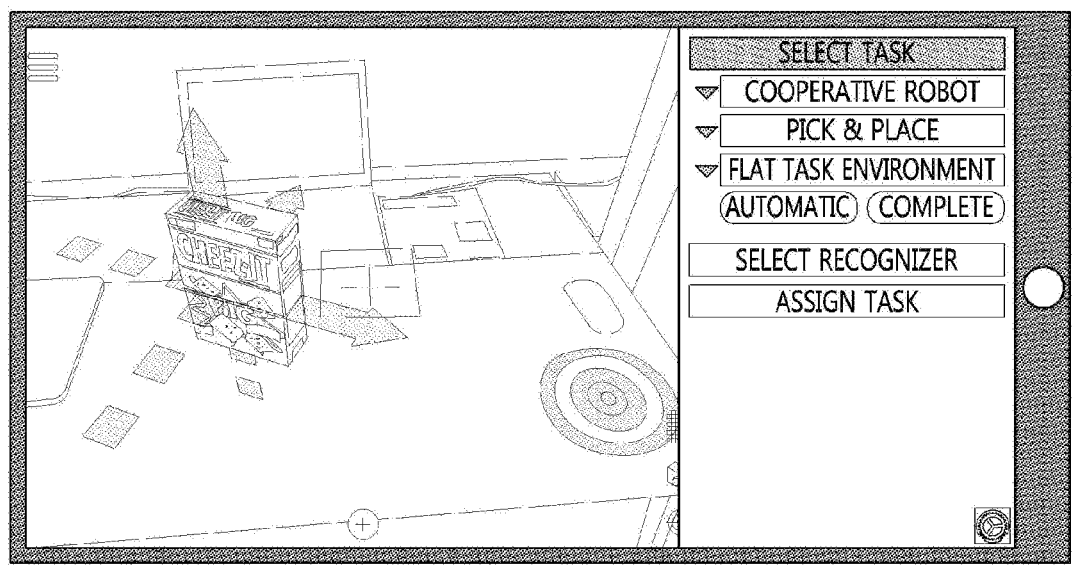

Referring to FIG. 14, the result of selecting the task selection button in the user interface is illustrated.

When the task selection button is selected in the user interface, a field selection button, a detailed task selection button, and a task environment selection button are displayed.

The field selection button may display options for task fields, such as 'cooperative robot', 'cleaning robot', 'care robot', and the like, and a task field may be selected from among the options.

Also, in the case of 'cooperative robot', the detailed task selection button may display options for detailed tasks, such as 'Pick & Place', 'Peg-in-Hole', and the like, and a detailed task may be selected from among the options.

In the case of a cleaning robot, the detailed task selection button may display options for detailed tasks, such as 'set cleaning path', 'set obstacle', and the like, and a detailed task may be selected from among the options.

In the case of a care robot, the detailed task selection button may display options for detailed tasks, such as 'set observation area/path', 'set observation object', and the like, and a detailed task may be selected from among the options.

The task environment selection button may enable information about the environment in which the current task is performed to be selected.

Here, the task environment selection button may display options for task environments, such as a single plane, multiple planes, a residential space, and the like, and a task environment may be selected from among the options.

The single plane may correspond to an environment in which a task is performed in a single plane, such as on the table, in a single room, or the like.

The multiple planes may correspond to an environment in which a task is performed in multiple planes, such as a table and a floor, a table and a shelf, and the like.

The residential space may correspond to an environment in which a task is performed in the space, the floor plan of which is provided.

Also, an automation button may enable the function of predicting and proposing a task-related configuration using context information, such as an input image, position information, user information, and the like.

Also, a completion button may finalize the selected options for the task field, the detailed task, and the task environment.

Also, the control panel button may enable addition, deletion, and modification of the detailed configuration of the selected field, detailed task, and task environment.

Figure 15:
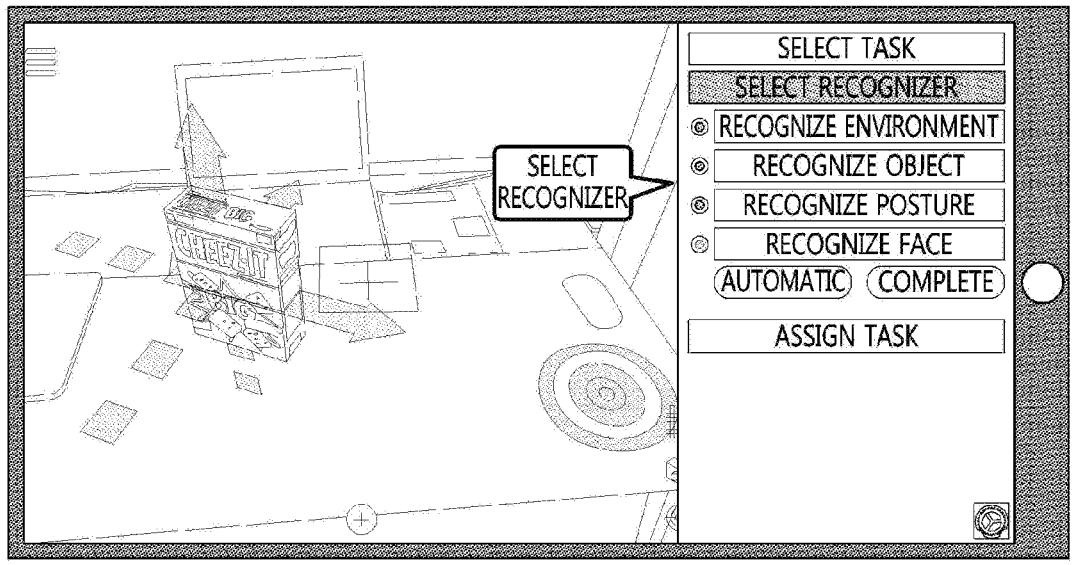

Referring to FIG. 15, the result of selecting the recognizer selection button in the user interface is illustrated.

When the recognizer selection button is selected in the user interface, an environment recognition button, an object recognition button, a posture recognition button, and a face recognition button are displayed.

The environment recognition button may enable selection as to whether to interwork with a recognizer and tracker suitable for the selected task environment.

For example, the task environment may be any of a single plane, multiple planes, or a residential space, which are the above-described options for the task environment.

The object recognition button may enable selection as to whether to interwork with an object recognizer and identifier suitable for the selected task.

For example, the object recognizer and the object identifier may provide recognition and identification functions optimized for any one of various objects, such as an inventory detection object, a capsule, furniture, and the like.

The posture recognition button may enable selection as to whether to interwork with a posture recognizer suitable for the selected environment, task, and object.

For example, the posture recognizer may provide a posture recognition function optimized for any one of the position/rotation on a plane and positions on multiple planes such as table/shelf, and the like.

The face recognition button may enable selection as to whether to interwork with a face recognizer when it is necessary for a care robot or the like to recognize the identity/position of a user.

For example, the face recognizer may identify a target and recognize the age, emotion, and the like of the target.

Also, an automatic selection button may enable a necessary recognizer to be predicted and automatically proposed using context information, such as an input image, position information, user information, and the like, and the selected field, task, and environmental context information.

Also, the completion button may finalize selection of the selected recognizers.

Also, the control panel button may enable addition, deletion, and modification of information about the recognizer.

Figure 16:
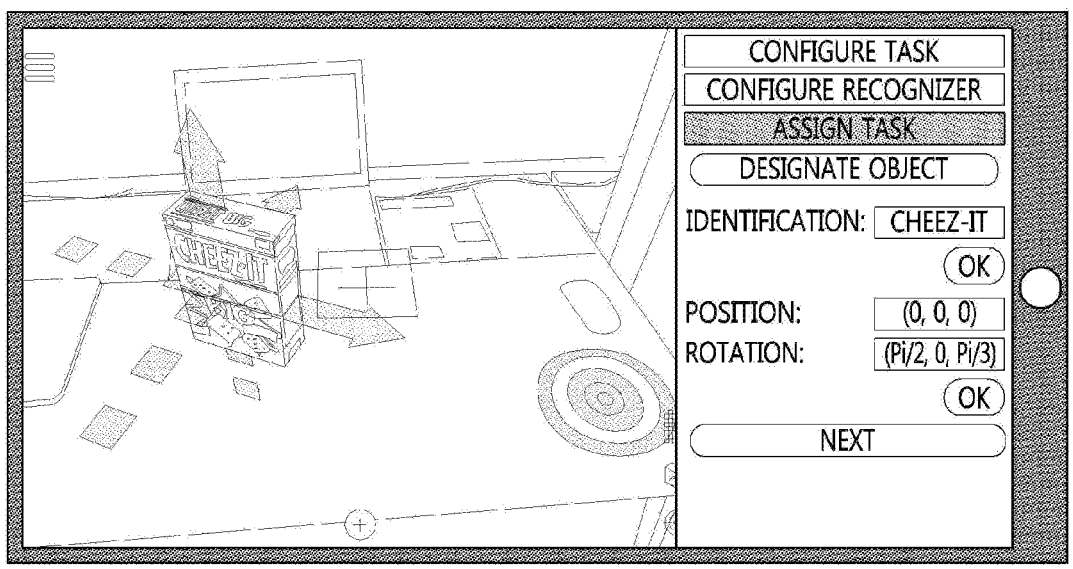

Referring to FIG. 16, the user interface displays an object designation button and displays identification information and position and rotation values after the task order button is selected.

Figure 17:
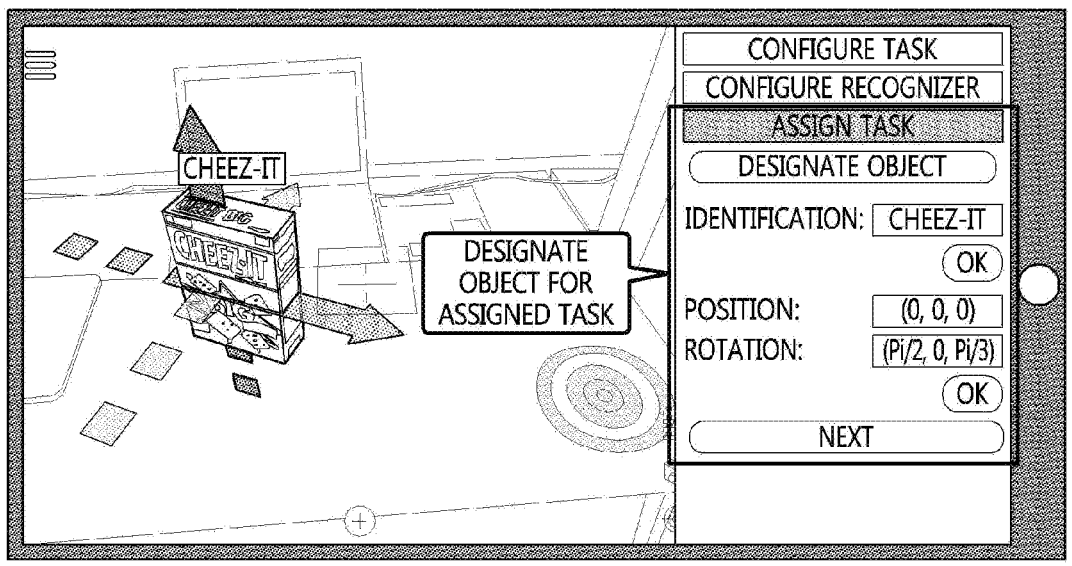

Referring to FIG. 17, an object may be designated using an object designation button, and the position and posture of the object may be recognized.

As described above, the user device 100 and the machine device 200 may set a capture direction so as to point to an object. After a cross mark is placed on the object or after the area of the object is touched, when a user touches the object designation button, the image of the object may be captured, and the object may be recognized in the captured image.

As shown in FIG. 17, the name of the identified object is 'Cheez-It'.

Here, the user device 100 and the machine device 200 may identify the designated object, and may display the object area and the object name using an augmented-reality method.

Here, when the object is identified, the user device 100 and the machine device 200 may again attempt to designate an object.

Here, the user device 100 and the machine device 200 may recognize the posture of the object, and may display the object area along with a coordinate axis using an augmented-reality method.

Here, when the posture of the object is recognized, the user device 100 and the machine device 200 may again attempt to recognize the posture of the object.

Also, when a 'next' button is input, the user interface may proceed to the next step of 'object designation' in the 'Pick & Place' task.

Figure 18:
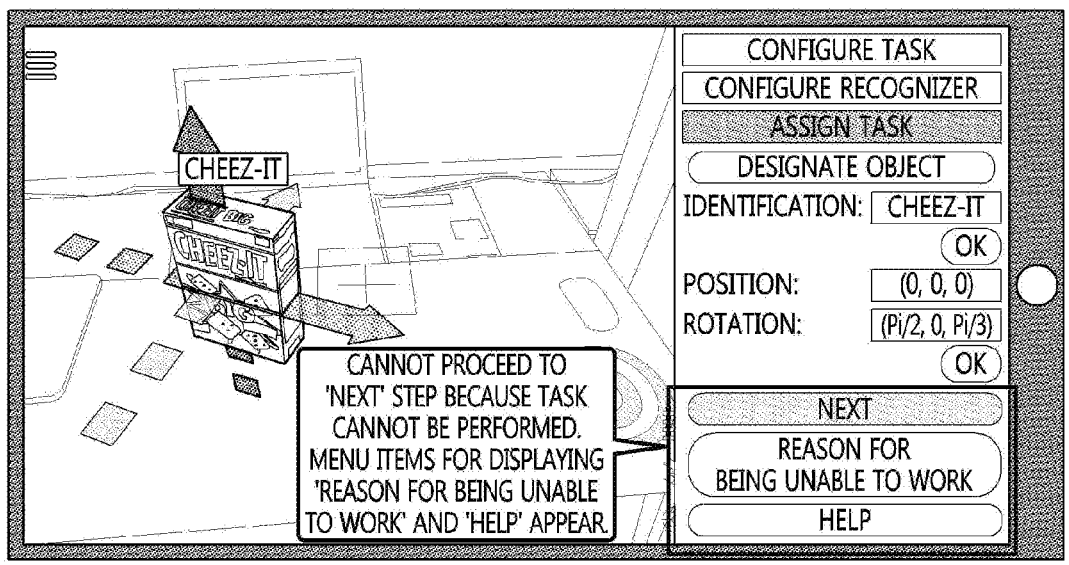

Referring to FIG. 18, after the 'next' button is selected in 'object designation', if a reason for being unable to work is present, the reason for being unable to work and help content may be output.

For example, when the reason for being unable to work is that the task is not suitable for being performed through a grasping task, that an object is too big, that an object is too heavy, or that the posture is not suitable, the user interface may output the physical condition of the object on which the task can be performed in help content.

Also, when the reason for being unable to work is that the position of the designated object is beyond the reach of a robot arm, the user interface may output the position of the object on which the task can be performed in help content.

Figure 19:
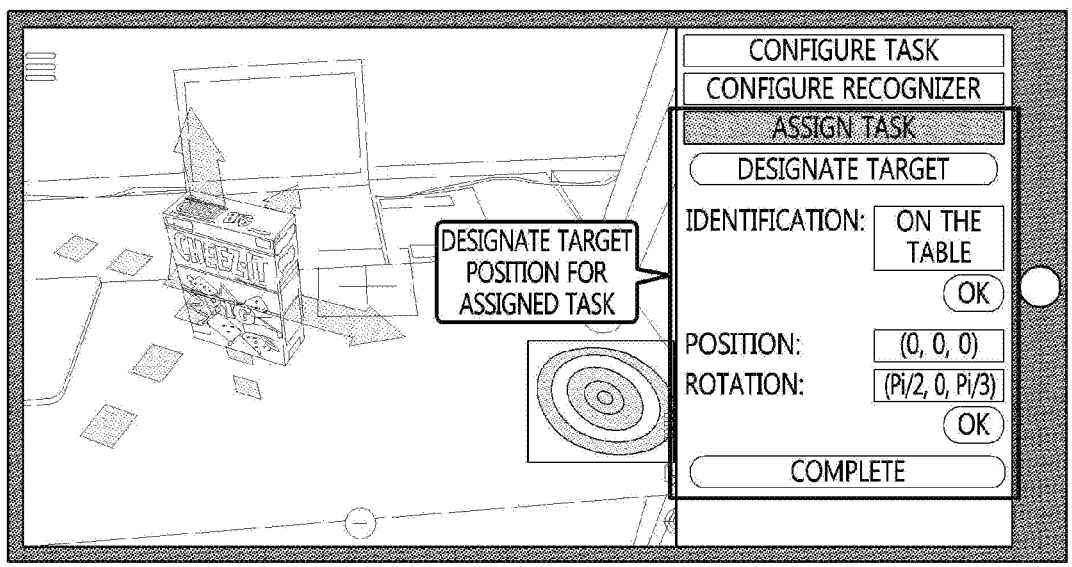

Referring to FIG. 19, when the 'next' button is input after the object is designated, the user interface displays a target designation button and displays the identification information and the position and rotation values of an aiming spot in response to designation of the aiming spot.

The user interface may identify the aiming spot as 'on the table', and may provide the function of setting the position of the aiming spot, to which the designated object is to be moved, and the rotation angle thereof.

Here, the user interface sets the position of the aiming spot, to which the object is to be moved, by receiving the touch on the aiming spot on the screen, and may then rotate the designated aiming spot through a GUI.

Here, the user interface may display the set position and rotation values using an augmented-reality method.

Here, the user interface may display a virtual object at the set aiming spot.

Also, the completion button may complete the task order by setting 'target position designation' in the 'Pick & Place' task.

Figure 20:
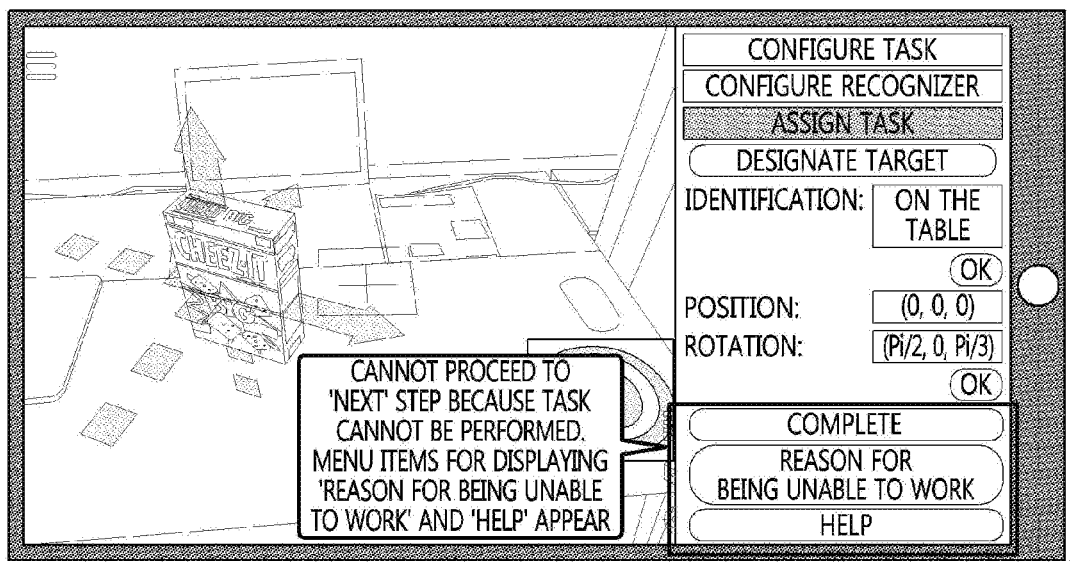

Referring to FIG. 20, after the completion button is selected in the target designation, when a reason for being unable to work is present, the reason and help content may be output.

For example, when the reason for being unable to work is that the task space is not flat so it is difficult to move an object therein, the user interface may output the condition of an accessible target position in help content.

Also, when the reason for being unable to work is that the position of the designated object is beyond the reach of a robot arm, the user interface may output the position of the object on which the task can be performed in help content.

Figure 21:
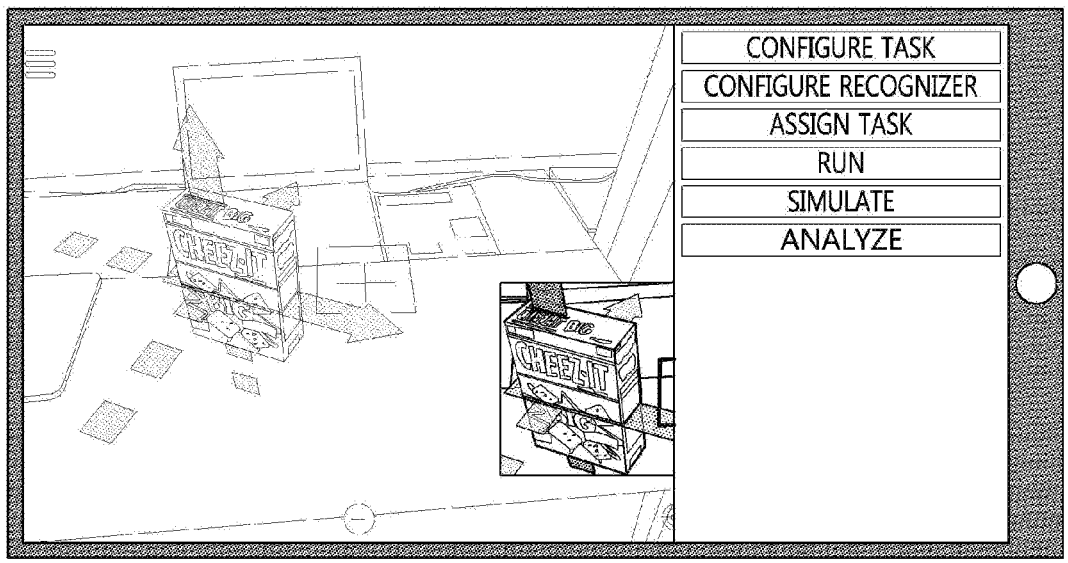

Referring to FIG. 21, the user interface may additionally provide buttons for various other functions.

A 'run' button may enable filming and recording of the running process.

Here, the 'run' button may enable monitoring of the state of the running process.

Also, a 'simulate' button may display the process in which a virtual robot arm moves a virtual object using an augmented-reality method before the process is actually performed.

Here, the 'simulate' button may guide a task for solving a problem when the problem has occurred in the task process, and may enable going back to the previous task process.

Also, an 'analyze' button may enable analysis of the data acquired from the simulation or the result of performing the process, and may enable the analysis result to be output.

FIGS. 22 to 27 are views illustrating a user interface corresponding to another example of a task process using a human-machine interaction method according to an embodiment of the present invention.

Figure 22:
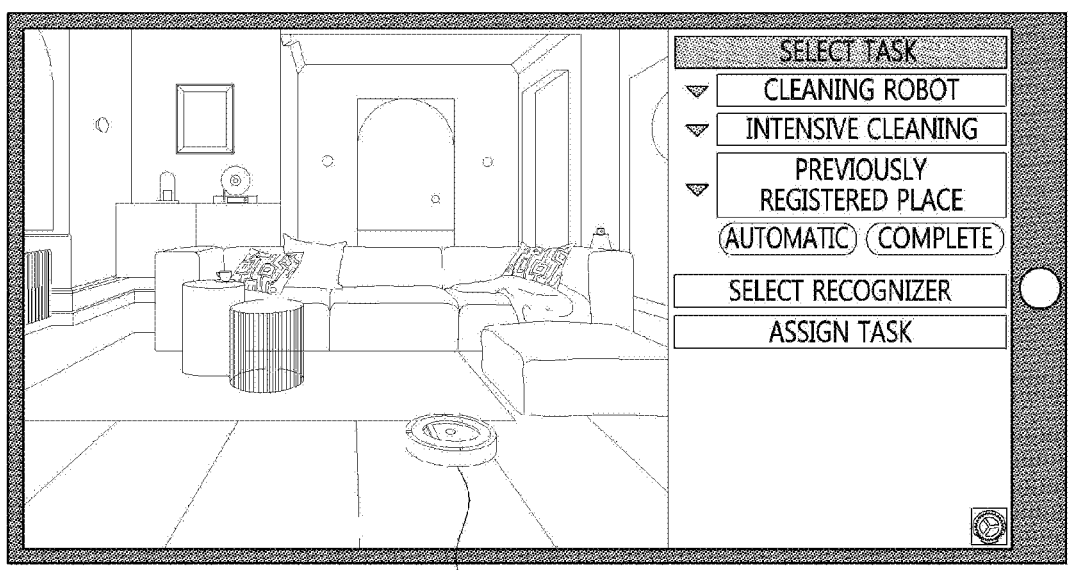
FIGS. 22 to 27 are views illustrating a user interface corresponding to another example of a task process using a human-machine interaction method according to an embodiment of the present invention.

Referring to FIG. 22, the user interface described with reference to FIGS. 13 to 21 is illustrated.

Here, the user interface displays the state in which 'cleaning robot' is selected through the field button of the task selection button, 'intensive cleaning' is selected through the detailed task button, and the previously registered place is selected as the task environment.

For example, the detailed tasks of the cleaning robot may include options such as intensive cleaning, setting a path, setting an obstacle, and the like.

Also, the task environment of the cleaning robot may include options such as a previously registered place and new registration.

The user interface shows the captured image containing the residential environment of an apartment house and the cleaning robot 30.

Figure 23:
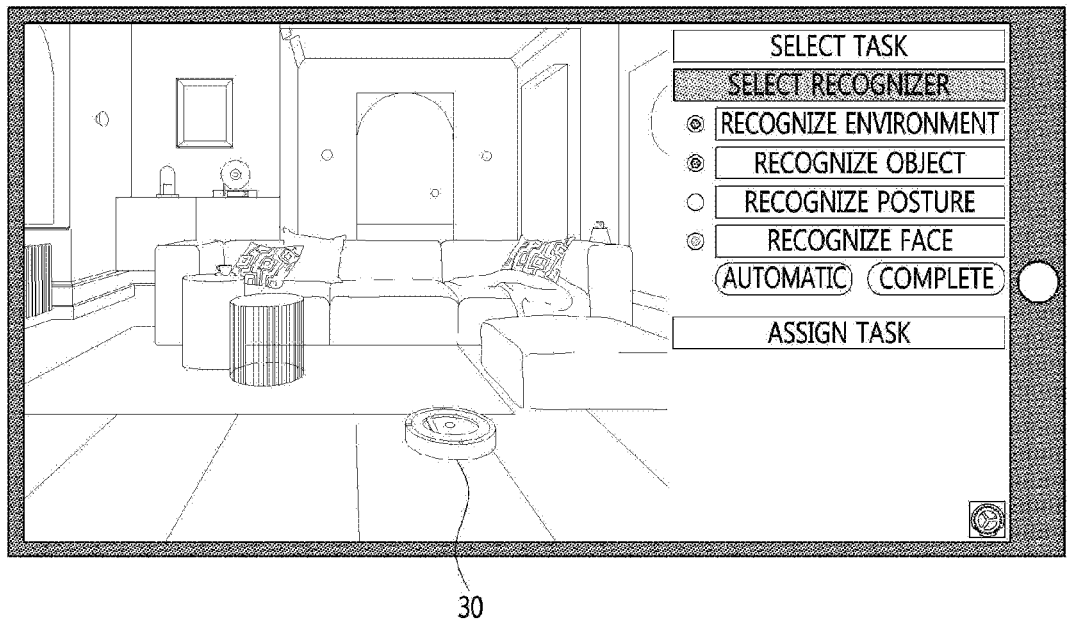

Referring to FIG. 23, the user interface corresponding to the recognizer selection of the cleaning robot is illustrated.

For example, in the case of the cleaning robot, the user interface may display the result in which the environment recognition option and the object recognition option are automatically selected.

Here, the type and performance of the recognizer may be changed depending on a service policy.

Figure 24:
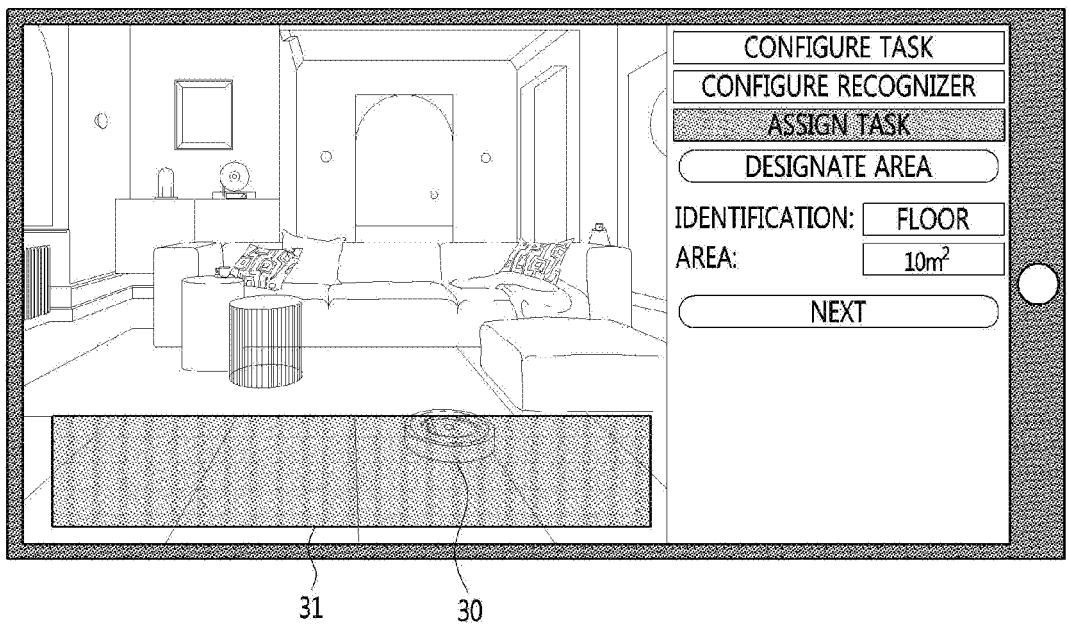

Referring to FIG. 24, a task order button is selected in the user interface, whereby an area designation button is displayed in the user interface.

The area designation button may enable designation of the task area 31 for 'intensive cleaning'.

The user may make the user device 100 recognize the area 31 on which the task is to be performed by moving the user device 100.

Here, the user device 100 may recognize the task area 31 using the tracking function of hardware, an operating system, and a development tool.

When the task area 31 is a 'previously registered place', the user interface displays the task area 31 so as to be superimposed on a planimetric map, and may preferentially display convenience information such as the area and the like.

Figure 25:
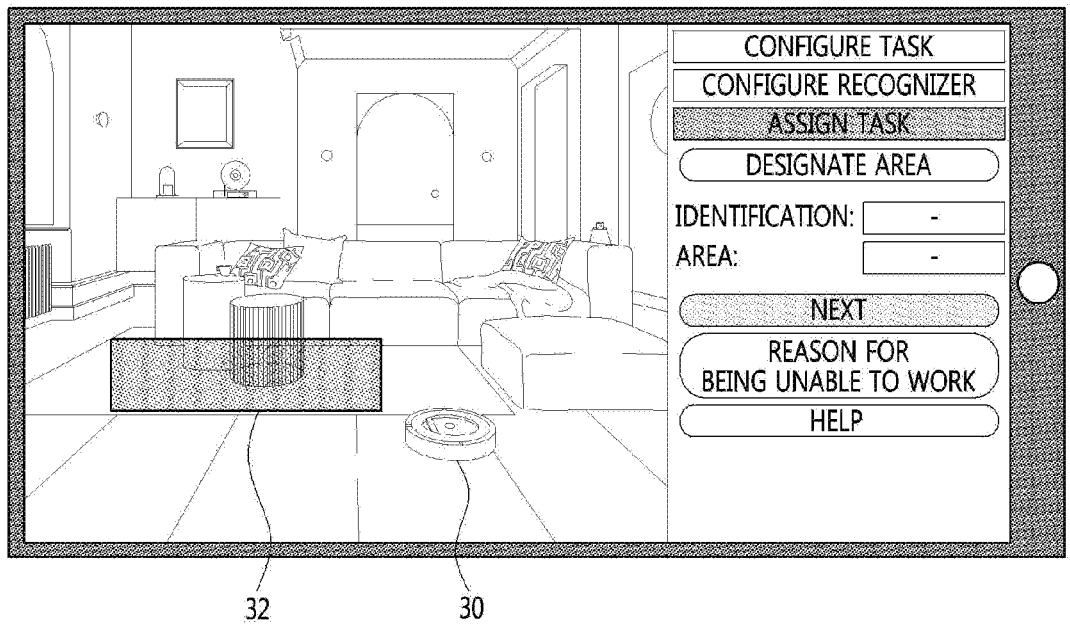

Referring to FIG. 25, an inaccessible task area 32 is displayed in the user interface.

The inaccessible task area 32 may be formed when the cleaning robot 30 is not able to detect the task area 31 or when there is another reason that makes the task impossible.

For example, when the task area 31 is too complicated or when the task area is recognized as two planes (for example, the living room floor and the porch floor), the inaccessible work area 32 may be formed.

Here, the user device 100 and the machine device 200 visualize the recognized inaccessible task area 32, output the reason for being unable to work, and request designation of the task area 31 again.

Figure 26:
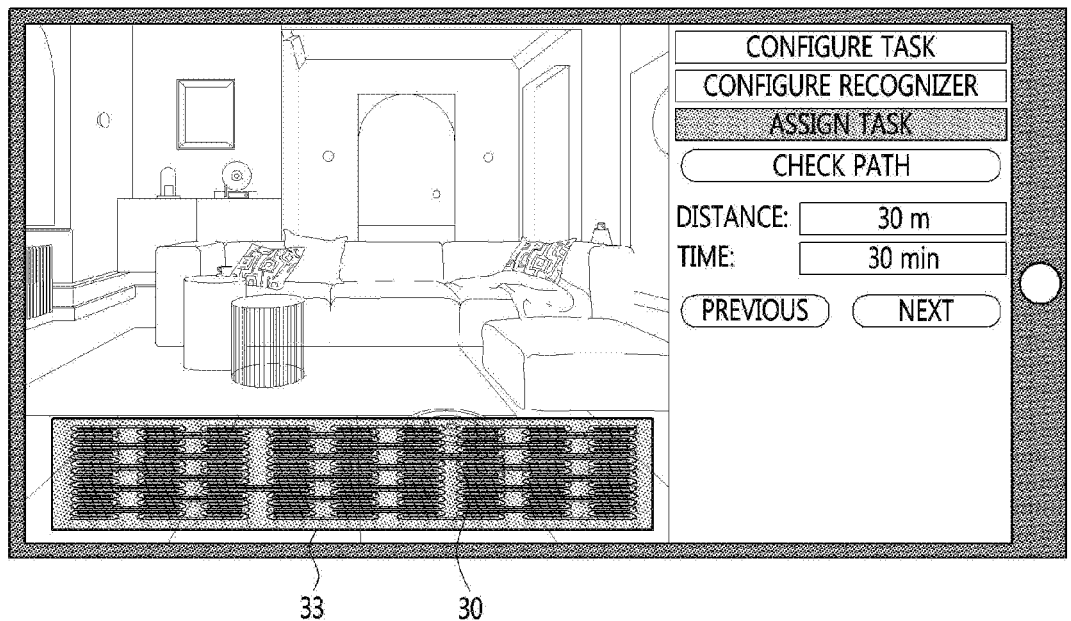

Referring to FIG. 26, the user interface displays the path 33 along which the cleaning robot 30 moves in order to perform a task for the designated task area 31.

Here, the user device 100 and the machine device 200 calculate the distance and the expected time for the path 33 and output the same through the user interface.

Here, the user interface displays '30 m' and '30 min.' as the calculated distance and time, respectively.

Figure 27:
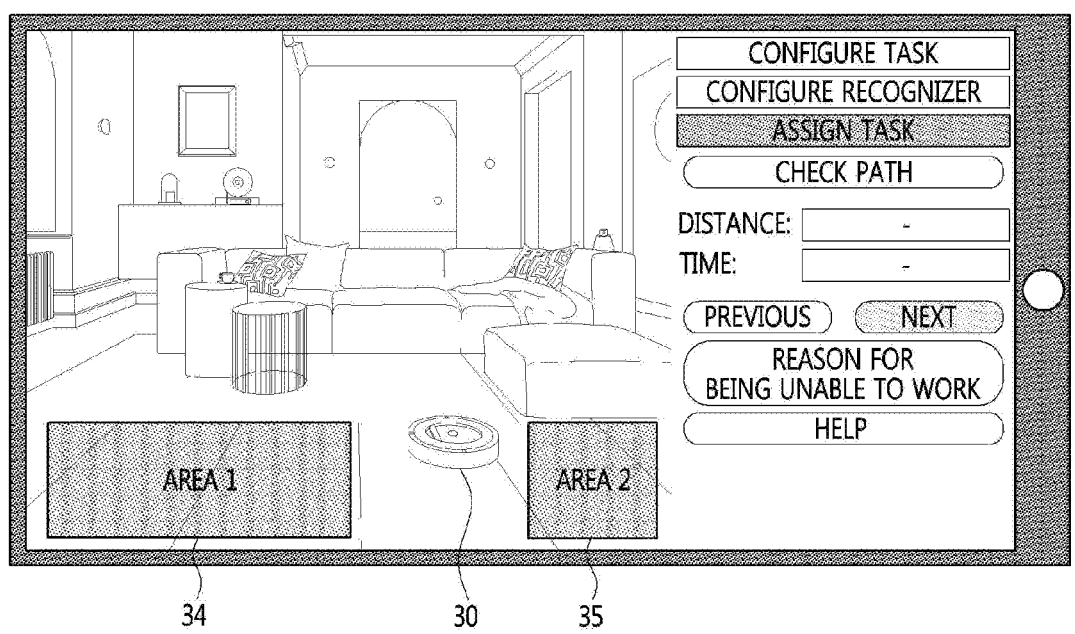

Referring to FIG. 27, after the 'next' button is touched on the interface screen illustrated in FIG. 26, when a reason for being unable to work occurs because the path 33 cannot be determined in the task area 31, the user interface may output the reason.

For example, when the recognized task area is not a single plane but two areas 34 and 35 that are separated by an obstacle, as shown in FIG. 27, or when the battery life of the cleaning robot is not sufficient to perform the task over the entire path 33, the user interface may display the reason why the task cannot be performed.

Here, the user interface may provide the function of modifying the path 33.

The path modification function may enable the path to be modified using a 'drawing' function for a curved path, by modifying the task area 31, or by receiving information about the place required to be avoided as the obstacle.

For example, when the first area 34 is selected as an obstacle area and when the second area 35 is selected as a task area, the user device 100 and the machine device 200 may recalculate a path only for the second area 35.

Here, after the modification of the path is completed, when the 'next' button is touched in the user interface, the cleaning robot 30 may run the actual cleaning task by moving along the path.

The user device 100 and the machine device 200 may output information about an obstacle on the path in advance if they include an object recognizer, and may modify the path so as to avoid the obstacle.

Also, as described above with reference to FIG. 21, the user interface may additionally provide buttons for various other functions for the cleaning robot.

A 'run' button may enable filming and recording of the running process.

Here, the 'run' button may enable monitoring of the state of the running process.

Also, a 'simulate' button may display the process in which a virtual cleaning robot moves along the calculated path using an augmented-reality method before the process is actually performed.

Here, the 'simulate' button may guide a task for solving a problem when the problem has occurred in the task process, and may enable going back to the previous task process.

Also, an 'analyze' button may enable analysis of the data acquired from the simulation or the result of performing the process, and may enable the analysis result to be output.

Figure 28:
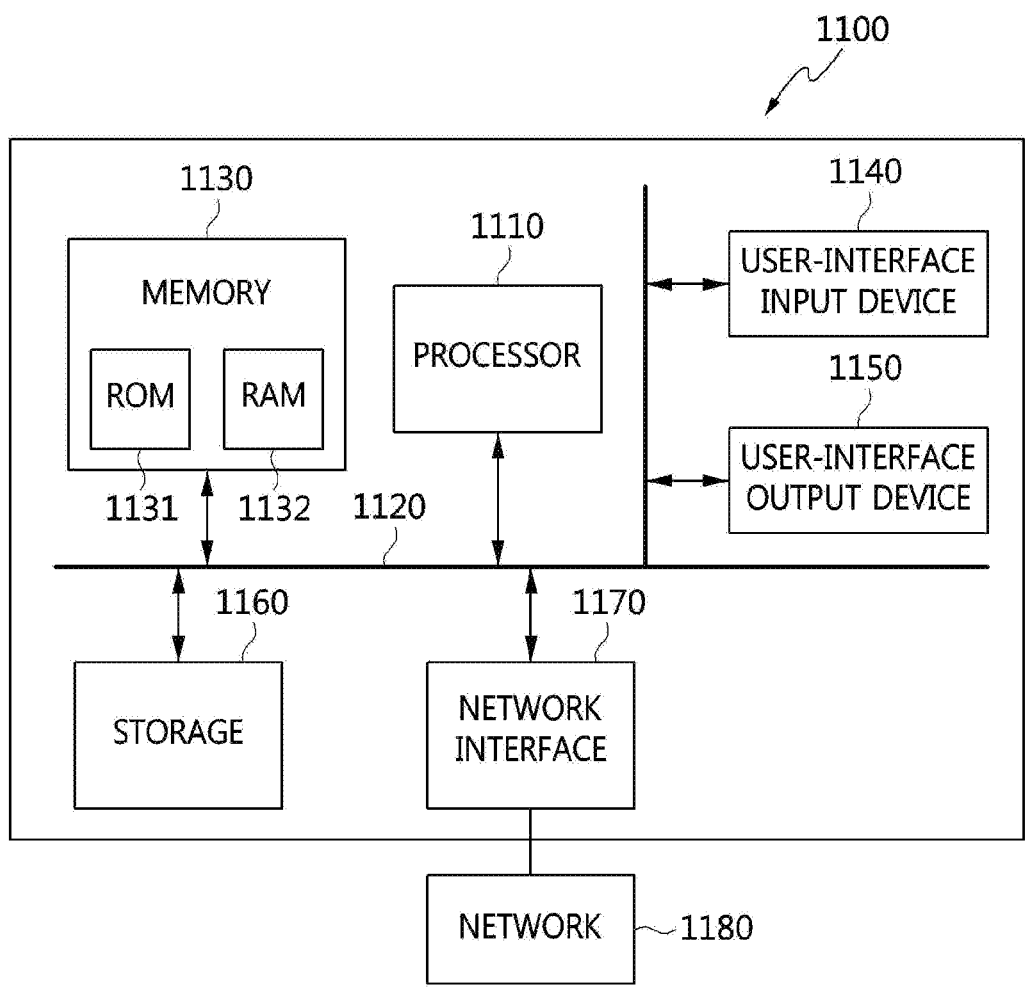
FIG. 28 is a view illustrating a computer system according to an embodiment of the present invention.

FIG. 28 is a view illustrating a computer system according to an embodiment of the present invention.

Referring to FIG. 28, a user device 100 and a machine device 200 for human-machine interaction according to an embodiment of the present invention may be implemented in a computer system 1100 including a computer-readable recording medium. As shown in FIG. 28, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The user device for human-machine interaction according to an embodiment of the present invention includes one or more processors 1110 and executable memory 1130 for storing at least one program executed by the one or more processors 1110. The at least one program may receive object identification input for identifying an object related to the task to be dictated to a machine through an I/O interface for displaying a 3D space, display an object identification visual interface corresponding to the object identified within the space recognized by the machine in an augmented-reality manner, receive position identification input for identifying a position in the 3D space related to the task, and display a position identification visual interface corresponding to the position identified within the space recognized by the machine in an augmented-reality manner.

Here, the object identification visual interface may include posture information displayed within a preset area from the center of the identified object.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

Here, the position may be identified differently depending on the type of the recognized object.

Here, the peripheral information may be generated differently depending on the type of the recognized object.

Here, the at least one program may display task visual feedback related to the task identified based on the object and the position in an augmented-reality manner.

Here, the object identification visual interface may include information about a path along which the identified object is able to move within the 3D space.

Also, the machine device for human-machine interaction according to an embodiment of the present invention includes one or more processors 1110 and executable memory 1130 for storing at least one program executed by the one or more processors 1110. The at least one program may receive object identification input for identifying an object related to the task to be dictated by a user device, generate object identification visual interface information corresponding to the object identified within a space in response to the object identification input, receive position identification input for identifying a position within the space from the user device, generate position identification visual interface information corresponding to the position identified within the space in response to the position identification input, identify the task based on the object and the position, and perform an operation corresponding to the identified task.

Here, the object identification visual interface may include posture information displayed within a preset area from the center of the identified object.

Here, the posture information may include information about an x-axis, a y-axis, and a z-axis corresponding to the 3D posture of the object.

Here, the position identification visual interface may include peripheral information displayed within a preset area from the identified position and corresponding to a peripheral object located at the position.

Here, the peripheral information may be generated based on the properties of the peripheral object.

Here, the properties of the peripheral object may include one or more of the posture and material of the peripheral object.

Here, the position may be identified differently depending on the type of the recognized object.

Here, the peripheral information may be generated differently depending on the type of the recognized object.

Here, the user device may display task visual feedback related to the task identified based on the object and the position in an augmented-reality manner.

Here, the object identification visual interface may include information about a path along which the identified object is able to move within the 3D space.

The method for human-machine interaction and the apparatus for the same according to an embodiment of the present invention may enable a human and a robot to accurately and efficiently share complicated 3D task information therebetween.

Particularly, the method for human-machine interaction and the apparatus for the same according to an embodiment of the present invention may dictate 3D information to a machine using an augmented-reality scheme, and may check what the machine understands through 3D visualization.

Also, the method for human-machine interaction and the apparatus for the same according to an embodiment of the present invention may intuitively dictate a complicated 3D task to a machine and visualize what the machine understands, thereby easily demonstrating the task.

Also, because a recent mobile terminal, such as a smartphone or the like, includes a camera, a sensor, and the base of visualization technology in the form of an API installed therein for augmented reality, the method for human-machine interaction and the apparatus for the same according to an embodiment of the present invention may use the installed components when a system for interaction with an interface is configured. That is, a smartphone or a smart pad may be used as the apparatus for human-machine interaction.

The present invention may enable a human and a robot to interact with each other by accurately and efficiently sharing complicated 3D task information therebetween.

Also, the present invention may enable intuitive communication of a complicated 3D task to a robot and visualization of what the robot understands.

Also, the present invention may provide applications related to a complicated 3D task and service for a real-world object.

Also, the present invention may provide a task instruction to a robot in an interactive manner.

As described above, the method for human-machine interaction and the apparatus for the same according to the present invention are not limitedly applied to the configurations and operations of the above-described embodiments, but all or some of the embodiments may be selectively combined and configured, so that the embodiments may be modified in various ways.

What is claimed is:

1. A method for human-machine interaction, comprising:
receiving object identification input for identifying an object related to a task to be dictated to a machine through an I/O interface of a user device that displays a 3D space;
displaying an object identification visual interface, corresponding to the object identified within a space recognized by the machine, on the user device in an augmented-reality manner;
receiving position identification input for identifying a position in the 3D space related to the task;
displaying a position identification visual interface, corresponding to the position identified within the space recognized by the machine, on the user device in an augmented-reality manner; and
receiving information related to a result of the task performed through the machine,
wherein the object identification visual interface includes posture information displayed within a preset area from a center of the identified object, and
wherein the position identification visual interface includes peripheral information displayed within a preset area from the identified position and corresponding to a peripheral object located at the position.

2. The method of claim 1, wherein the posture information includes information about an x-axis, a y-axis, and a z-axis corresponding to a 3D posture of the object.

3. The method of claim 1, wherein the peripheral information is generated based on properties of the peripheral object.

4. The method of claim 3, wherein the properties of the peripheral object include one or more of a posture and a material of the peripheral object.

5. The method of claim 1, wherein the position is identified differently depending on a type of the identified object.

6. The method of claim 1, wherein the peripheral information is generated differently depending on a type of the identified object.

7. The method of claim 1, further comprising:
displaying task visual feedback related to the task, which is identified based on the object and the position, on the user device in an augmented-reality manner.

8. The method of claim 1, wherein the object identification visual interface includes information about a path along which the identified object is able to move within the 3D space.

9. A user device, comprising:
one or more processors; and
executable memory for storing at least one program executed by the one or more processors,
wherein the at least one program is configured to:
receive object identification input for identifying an object related to a task to be dictated to a machine through an I/O interface that displays a 3D space,
display an object identification visual interface corresponding to the object identified within a space recognized by the machine in an augmented-reality manner,
receive position identification input for identifying a position in the 3D space related to the task, and
display a position identification visual interface corresponding to the position identified within the space recognized by the machine in an augmented-reality manner,
wherein the object identification visual interface includes posture information displayed within a preset area from a center of the identified object, and
wherein the position identification visual interface includes peripheral information displayed within a preset area from the identified position and corresponding to a peripheral object located at the position.

10. The user device of claim 9, wherein the peripheral information is generated based on properties of the peripheral object.

11. The user device of claim 10, wherein the properties of the peripheral object include one or more of a posture and a material of the peripheral object.

12. The user device of claim 9, wherein the at least one program displays task visual feedback related to the task identified based on the object and the position in an augmented-reality manner.

13. A machine device, comprising:
one or more processors; and
executable memory for storing at least one program executed by the one or more processors,
wherein the at least one program is configured to:
receive object identification input for identifying an object related to a task to be dictated by a user device,
generate information about an object identification visual interface corresponding to the object identified within a space in response to the object identification input,
receive position identification input for identifying a position within the space from the user device,
generate information about a position identification visual interface corresponding to the position identified within the space in response to the position identification input,
identify the task based on the object and the position, and
perform an operation corresponding to the identified task,
wherein the object identification visual interface includes posture information displayed within a preset area from a center of the identified object, and
wherein the position identification visual interface includes peripheral information displayed within a preset area from the identified position and corresponding to a peripheral object located at the position.

14. The machine device of claim 13, wherein the position is identified differently depending on a type of the identified object.

* * * * *